Jan. 14, 1964 C. A. CLARK 3,117,862
ALLOYS FOR ELECTROMECHANICAL DEVICES AND PRECISION INSTRUMENTS
Filed Jan. 5, 1962
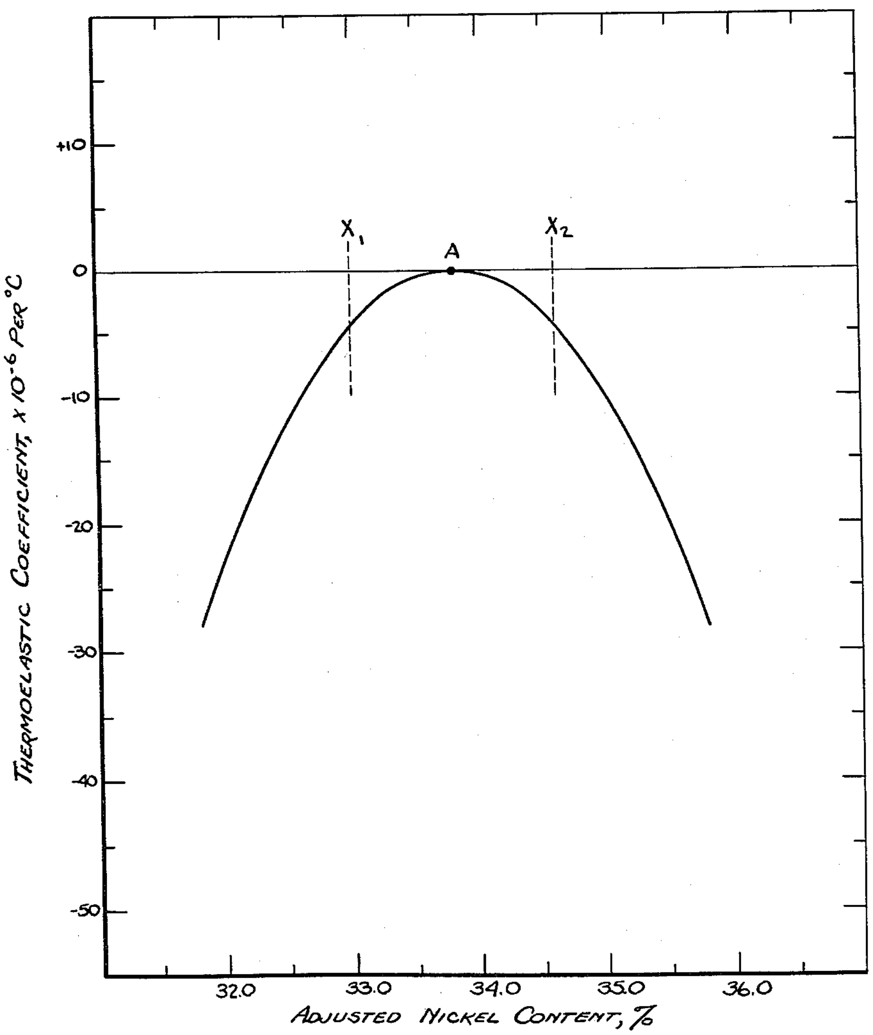
INVENTOR.
CHARLES ALFRED CLARK
BY
ATTORNEY Lines 1-2 header: United States Patent Office 3,117,862 Patented Jan. 14, 1964

1

3,117,862

ALLOYS FOR ELECTROMECHANICAL DEVICES AND PRECISION INSTRUMENTS

Charles Alfred Clark, Perry Barr, Birmingham, England, assignor to The International Nickel Company, Inc., New York, N.Y., a corporation of Delaware Filed Jan. 5, 1962, Ser. No. 164,545
Claims priority, application Great Britain Sept. 6, 1961
4 Claims. (Cl. 75—124)

This invention relates to improved age hardenable alloys for electromechanical devices and precision instruments and to age hardened articles of manufacture made therefrom, and more particularly to age hardenable iron-nickel-chromium-tatanium alloys for electromechanical filters, acoustic delay lines and precision springs, and to age hardened articles of manufacture made therefrom.

In the technologies of instrumentation and electronics there arise frequently, demands for alloys with special combinations of mechanical and magnetic properties. There are, for example, various uses for precision springs such as are used in indicating and control devices depending on elastic deflection. In addition, numerous applications exist for vibratory elements for transmitting mechanical vibrations, e.g., tuning forks, electromechanical filters, wire-type acoustic delay lines, etc.

The precise physical requirements may differ somewhat according to the application. For example, in order to improve rejection of unwanted frequencies in filters and reduce attenuation of the acoustic signal in delay lines, an alloy possessing low damping capacity should be used. Use of an alloy with a low Young's modulus is also advantageous in acoustic delay lines since a given delay can then be obtained with a shorter length of wire. In addition, zero change of sound velocity with temperature and a high electromechanical coupling coefficient are required in electroacoustic devices. In practice, some of these requirements may be mutually incompatible, for example, a material possessing a high electromechanical coupling coefficient will tend to have high damping. These difficulties may be overcome for example by welding together two components one having high electromechanical coupling coefficient the other having good acoustic transmission properties.

An alloy for production of precision springs should possess a small negative temperature coefficient of Young's modulus numerically equal to the coefficient of linear thermal expansion, low mechanical hysteresis and high tensile strength and limit of proportionality. The sum of the temperature coefficient of Young's modulus of elasticity plus the coefficient of linear expansion is equal to the thermoelastic coefficient.

It was shown by Chevenard that binary nickel-iron alloys containing 27 and 44% nickel possessed zero temperature coefficient of Young's modulus. Binary alloys containing less than 27% or more than 44% nickel were characterized by a negative temperature coefficient of Young's modulus, whereas those containing nickel within the range 27 to 44% showed a positive coefficient, a maximum value of about $+260\times10^{-6}/°$ C. being observed for 34% nickel-iron alloy. The temperature coefficients of the 27 and 44% nickel-iron alloys are, however, very sensitive to variations in composition. Additional elements, such as chromium or molybdenum, were therefore added to the 34% nickel alloy in order to reduce the maximum temperature coefficient of elasticity to zero and in principle to provide better reproducibility of properties between different batches of material. The mechanical properties of these alloys are improved by cold working up to 90% reduction in area in order to make them suitable for use in springs. If difficult forming operations are required, however, the alloys can only be used in the relatively soft condition. To overcome this problem, and reduce costs of processing, small amounts of titanium or beryllium were added in order to produce alloys that could be processed and formed in the softened condition and subsequently age hardened by heat-treatment in order to precipitate a second phase.

In practice, alloys available commercially are not completely satisfactory. Values of the temperature coefficient of Young's modulus and damping capacity are often too large and the tensile strength could usefully be higher. Although many attempts were made to overcome the foregoing difficulties and other disadvantages, none, as far as I am aware, was entirely successful when carried into practice commercially on an industrial scale.

It has now been discovered that iron-nickel-chromium-titanium alloys containing special associated and coordinated amount of nickel, chromium and titanium are characterized by improved strength and electrical resistance, low damping capacity and a small themoelastic coefficient in the old-worked and age-hardened condition, and that particularly good reproducibility of these characteristics is achieved by limiting the composition to critical ranges of composition.

It is an object of the present invention to provide age hardenable and age hardened iron-nickel-chromium-titanium alloys having low signal attenuating characteristics when used as vibratory electromagnetic responsive elements and which have small temperature coefficients of resonant frequency and/or time delay in the cold worked and age hardened condition.

Another object of the invention is to provide reproducible age hardenable and age hardened iron-nickel-chromium-titanium alloys having high strength, low damping capacity and a small thermoelastic coefficient in the cold worked and age hardened condition.

The invention also contemplates providing, as articles of manufacture, vibratory electromagnetic responsive elements having low temperature coefficients of resonant frequency and time delay, and low signal attenuating characteristics.

It is a further object of the invention to provide, as articles of manufacture, resilient elements having high strength, low damping capacity and a small thermoelastic coefficient.

Other objects and advantages will become apparent from the following description taken in conjunction with the accompanying drawing which is a graph wherein the thermoelastic coefficients of iron-nickel-chromium-titanium alloys containing 6.5% chromium, cold worked and age hardened in accordance with the invention, are plotted against the adjusted nickel contents of the alloys.

Broadly stated, the present invention contemplates age hardenable alloys consisting of, in weight percents, from 41.4% to 43% nickel, from 2.5 to 3.1% titanium, from 6.3 to 7.1% chromium, up to 0.6% aluminum, up to 0.05% carbon, with the balance iron, wherein the relationship between the nickel content, the titanium content, and any carbon and aluminum present is such that Ni—3.69(Ti—4C+Al—0.9) is from 33.0% to 34.6%, the symbols Ni, Ti, C and Al being the respective weight percentage of nickel, titanium, carbon and aluminum present in the alloy. In addition to iron, the balance of the alloy includes small amounts of deoxidizers, malleableizers and impurities, such as up to 0.4% silicon, e.g., 0.2 to 0.4%, up to 0.2% cobalt, up to 0.4% manganese, e.g., 0.2 to 0.4%, up to 0.1% zirconium, up to 0.015% sulfur and up to 0.015% phosphorus, which do not materially affect the basic and novel characteristic of the alloy. For the purpose of obtaining a thermoelastic coefficient equal to zero it is advantageous to further control the percentages of nickel, titanium and chromium in the aforementioned alloy composition to be equal to 42.2% nickel, 2.8% titanium and 6.5% chromium.

In making alloys of the kind to which the invention relates by normal air melting practice, carbon and aluminum are added to give suitable de-oxidizing conditions in the melt, and it is usual for the aluminum and carbon contents of the final alloy to be about 0.2% to about 0.4% and 0.02% respectively. In the resultant alloys the titanium, except that combined with carbon, and any alminum form a precipitable $Ni_3$(Ti, Al) phase, and as the alloys are used in the age hardened state this phase is precipitated during age hardening. The thermoelastic coefficient of the age hardened alloy depends only on the composition of the matrix after precipitation has occurred. It is therefore necessary in computing this coefficient to allow for the amount of nickel precipitated as the phese $Ni_3$( Ti, Al), and to make use of an adjusted nickel content which is defined by the expression Ni—3.69(Ti—4C+Al—0.9).

The alloys of the present invention are age hardened by heat treating for about 0.5 to 5.0 hours at temperatures of from about 550° C. to about 750° C. when so heat treated, the alloys of the invention are age hardened alloys in the sense that they are fully or substantially completely age hardened, i.e., the hardness has been increased to about the maximum extent obtainable by age hardening. This age hardened condition is in contrast to some other so-called age hardened alloys which actually are only partially age hardened, or are stress relieved. Advantageously, the alloys of the invention are solution treated for about 1.0 to 5.0 hours at temperatures of from about 1000° C. to 1150° C. and water quenched prior to age hardening.

Cold working is performed on these new alloys after any solution treatment and prior to age hardening, a higher tensile strength. This produces an increase in Young's modulus and a preferred grain orientation. The amount of cold working performed in accordance with the invention is that equivalent to from about 10% to 70% reduction in area. Variations in the amount of cold working performed within this range have little or no effect on the thermoelastic coefficient after these alloys have been fully aged. Thus, the alloys of the invention have the advantage of being characterized by small thermoelastic coefficients which are substantially independent of the effect of cold working. In practice, this advantage provides for achieving great accuracy in fabricating elements with small thermoelastic coefficients since it avoids errors due to inaccuracies in predicting the effect of cold working upon the thermoelastic coefficient, such as otherwise can arise in the cold forming of precision springs of alloys having thermoelastic coefficients which are sensitive to cold working.

An advantageous processing schedule for the alloys of the invention, particularly in making wire for acoustic delay lines, is to solution treat for 2 hours at 1000° C., water quench, cold draw to 35% reduction in area, and age for 3 hours at 650° C. Because of domain relaxation effects, which produce an irreversible change in Young's modulus, finished components should be stabilized after production by heating to a temperature above the Curie temperature for example from about 100° C. to about 300° C. for a period of about half an hour.

The accompanying drawing illustrates the effect of variations in adjusted nickel content upon the thermoelastic coefficients of iron-nickel-chromium-titanium alloys with 6.5% chromium which have been age hardened in accordance with the invention. The point designated A represents an alloy of the present invention having an adjusted nickel content of 33.8% and a thermoelastic coefficient of zero, and the two vertical lines designated $X_1$ and $X_2$ indicate the range of adjusted nickel contents (33.0 to 34.6%) of alloys within the invention. It is apparent from the drawing that within the range of alloys provided in accordance with the invention the thermoelastic coefficient changes only a minimum amount as the adjusted nickel content changes. Alloys of similar composition but having adjusted nickel contents outside the range of the invention are on steeper portions of this curve and undergo substantially greater variations in thermoelastic coefficient as the adjusted nickel content changes.

It is an advantageous feature of the present invention that the compositional ranges thereof provide for minimizing the changes of the thermoelastic coefficient as the adjusted nickel content changes. This feature provides for greater reproducibility of thermoelastic characteristics in commercial production of a large number of heats of the alloy. It will be appreciated that a problem exists in consistently obtaining the same thermoelastic characteristics in a number of heats of an alloy since in production it is not possible to produce a large number of heats which each have exactly the same composition. Moreover, variations in composition are particularly great in the case of the more readily oxidizable elements such as titanium, aluminum and carbon. The composition of the alloy of the invention is specially adapted to overcome this problem, at least to a large extent, since the amounts of these more readily oxidizable elements are proportioned by the formula for adjusted nickel content so as to provide that variations of these elements have a minimum effect on the thermoelastic coefficient, as illustrated by the curve in the drawing. Alloys within the broad range of composition, i.e., those consisting of from about 41.4% to 43% nickel, from about 2.5 to 3.1% titanium, from about 6.3 to 7.1% chromium, up to 0.6% aluminum, 0.05% carbon, with the balance iron and having adjusted nickel contents of from 33.0% to 34.6% are characterized by small thermoelastic coefficients throughout the temperature range of 0 to 50° C. when cold worked and age hardened by the aforementioned procedures. Such a small thermoelastic coefficient is in the range, including zero, of from minus 20 to plus $20 \times 10^{-6}/°$ C. Advantageous alloys containing 42.2% nickel, 2.8% titanium, 6.7% chromium, up to 0.6% aluminum, up to 0.05% carbon, with the balance iron and having adjusted nickel contents of from 33.0% to 34.6% are characterized by thermoelastic coefficients substantially equal to zero throughout the temperature range of 0 to 50° C. A thermoelastic coefficient substantially equal to zero is in the range, including zero, of from minus 10 to plus $10 \times 10^{-6}/°$ C.

For the purpose of giving those skilled in the art a better appreciation of the advantages of the invention, the following illustrative examples are set forth in Table I, showing chemical compositions as weight percentages of two alloys within the invention (Alloys I and II) and two alloys outside the invention (Alloys Y and Z). Table II shows results of testing the alloys of Table I after cold working and heat treating in accordance with the invention.

*Table I*

| Alloy | Ni | Cr | Ti | C | Al | Mn | Si | A.N.C. |
|---|---|---|---|---|---|---|---|---|
| I | 42.4 | 6.40 | 2.86 | 0.04 | 0.54 | 0.43 | 0.37 | 33.75 |
| II | 41.6 | 6.70 | 2.87 | 0.02 | 0.41 | 0.39 | 0.49 | 33.10 |
| Y | 41.7 | 6.63 | 2.34 | 0.01 | 0.41 | 0.41 | 0.22 | 35.0 |
| Z | 39.8 | 5.36 | 2.05 | 0.01 | 0.42 | 0.41 | 0.02 | 34.2 |

A.N.C.=Adjusted nickel content.

*Table II*

| Alloy | I.M., c.g.s.u. | E.R., $\mu\Omega$.-cm. | M.H., a.u. | T.E.C., $\times 10^6/°C$. | U.T.S., T.s.i. | P.L., T.s.i. | Hardness, V.P.N. |
|---|---|---|---|---|---|---|---|
| I | 39.4 | 118.0 | 2.6 | 10.0 | 104.0 | 82.5 | 444 |
| II | 34.0 | 120.0 | 2.0 | −15.0 | 95.0 | 80.0 | 425 |
| Y | 63.3 | 106.5 | 13.2 | −9.6 | 87.5 | 56.0 | 383 |
| Z | 66.9 | 101.5 | 12.1 | 60.0 | 89.0 | 62.5 | 383 |

I.M.=Intensity of magnetization per gram at 20° C. in c.g.s.u.
E.R., $\mu\Omega$- cm.=Electrical resistivity in microhm-centimeters at room temperature.
M.H.,a.u.=Area of magnetomechanical hysteresis loop in arbitrary units at 20° C.
T.E.C.=Thermoelastic coefficient throughout range 0–50° C.
U.T.S.=Ultimate tensile strength at room temperature.
P.L.=Proportional limit.
V.P.N.=Vickers diamond penetration hardness at room temperature.
T.s.i.=Long tons per square inch.

Some advantages of the alloy of the invention in electromagnetic communication applications, e.g., acoustic delay lines, will be appreciated when it is understood that the following factors may contribute to the attenuation of an acoustic signal in a delay line;

(*a*) Magnetoelastic damping produced by hysteresis of magnetostriction, (*b*) Micro eddy-currents in the region of magnetic domain boundary walls moving under the frequency of the stress wave and (*c*) The usual causes of damping in non-magnetic metals, e.g., friction produced by movement of dislocations, interstitial atoms, etc.

In using the alloy of the invention in acoustic delay lines, very low magnetoelastic damping is achieved due to the very small area of the magnetomechanical hysteresis loop of the alloy of the invention. Low micro eddy-current losses are also achieved by use of the alloy of the invention due to the relatively high electrical resistivity and low intensity of magnetization of the alloy of the invention. This is achieved since the energy dissipated by eddy currents is inversely proportional to the electrical resistivity and proportional to the square of the rate of change of magnetic intensity. The low intensity of magnetization of the alloy of the invention is associated with a correspondingly low rate of change of magnetic intensity with applied stress thus resulting in reduced micro-eddy-current losses. The low intensity of magnetization of alloys produced in accordance with the invention is not greater than about 46 c.q.s.u., e.g., about 32 to 46.

The very small area of the magnetomechanical hysteresis loop characterizing the alloy of the invention is also an advantage to using this alloy for springs and vibratory elements in precision instruments. Because of magnetostriction hysteresis, the stress-strain curves obtained during loading and unloading of an alloy do not coincide even though the elastic limit is not exceeded, a closed loop being formed by a plot of these curves. The area of the loop will correspond to energy dissipated per cycle by magnetomechanical hysteresis, which is a factor in the damping capacity of the alloy. This dissipation of energy is at least partially responsible for so-called magnetomechanical hysteresis in pressure capsules and in precision springs used in weighing machines. Thus, the low magnetomechanical hysteresis of the alloy of the invention promotes improved accuracy in precision instruments by providing for low errors due to magnetomechanical hysteresis losses of input signal energy in vibratory elements and precision springs.

The high limit of proportionality is advantageous for the purpose of minimizing the size and weight of elastically operable elements and the high ultimate tensile strength and hardness provide good mechanical Q for electromechanical filters.

The invention also provides alloys having low temperature coefficients of time delay in acoustic delay lines, low temperature coefficients of stiffness in helical springs and low temperature coefficients of resonant frequency in vibrating reeds. Advantageously, these temperature coefficients can be made to be zero by controlling the alloys so as to obtain a thermoelastic coefficient of zero in accordance with the teachings of the invention. These advantages can be understood in the light of the following equations.

The temperature coefficient of time delay in an acoustic delay line is given by the equation:

$$\frac{2}{\tau}\frac{\Delta\tau}{\Delta T}=-\left[\frac{1}{E}\frac{\Delta E}{\Delta T}+\alpha\right]$$

where $\tau$ is the time delay, E is Young's modulus of elasticity, T is the temperature, and $\alpha$ is the coefficient of linear thermoexpansion.

For a close wound helical spring the temperature coefficient of stiffness is given by the following equation:

$$\frac{1}{S}\frac{\Delta S}{\Delta T}=\frac{1}{G}\frac{\Delta G}{\Delta T}+\alpha=\frac{1}{E}\frac{\Delta E}{\Delta T}+\alpha-\frac{1}{\mu+1}\frac{\Delta\mu}{\Delta T}$$

where S is the stiffness, G is the torsional modulus and $\mu$ is Poisson's ratio. In practice, it has not been found necessary to make any distinction between alloys for components operating in torsion or in tension as it appears that the temperature coefficient of Poisson's ratio is relatively small, at least in alloys having a low temperature coefficient of Young's modulus. Therefore, in the above equation the term having Poisson's ratio can be regarded as being zero for practical purposes.

The temperature coefficient of resonant frequency of a rod vibrating longitudinally in its fundamental mode, e.g., a tuning fork or a vibrating reed, is given by the following equation:

$$\frac{2}{f}\frac{\Delta f}{\Delta T}=\frac{1}{E}\frac{\Delta E}{\Delta T}+\alpha$$

where small $f$ is the frequency. It can be seen from the above equations that for a given alloy the temperature coefficient of time-delay, stiffness and resonant frequency are all at a minimum when the sum of the temperature coefficient of Young's modulus plus the coefficient of linear thermoexpansion, which sum is the thermoelastic coefficient of the alloy, is at a minimum, and are equal to zero when the thermoelastic coefficient is equal to zero.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. An age hardenable, low damping capacity alloy having an improved high proportional limit and a small thermoelastic coefficient consisting of from 41.4 to 43% nickel, from 2.5 to 3.1% titanium, from 6.3 to 7.1% chromium, up to 0.6% aluminum, up to 0.05% carbon with the balance iron, the proportions of nickel, titanium, carbon, and aluminum being so correlated that Ni—3.69(Ti—4C+Al—0.9)

is from about 33.0 to 34.6%, where Ni, Ti, C and Al are respectively the weight percentages of nickel, titanium, carbon and aluminum present in the alloy, said alloy being characterized in the cold worked and fully age hardened condition by a combination of characteristics including an intensity of magnetization not greater than 46 c.g.s.u., a high proportional limit on the order of about 81 long tons per square inch and a thermoelastic coefficient in the range from minus $20\times10^{-6}$ per degree centigrated to $20\times10^{-6}$ per degree centigrade and said alloy being substantially insensitive to changes in thermoelastic coefficient resulting from variations in the amount of cold working prior to age hardening provided that said cold working is sufficient to effect a reduction in area within the range of 10% to 70%.

2. An age hardenable, low damping capacity alloy having an improved high proportional limit and a thermoelastic coefficient substantially equal to zero consisting of 42.2% nickel, 2.8% titanium, 6.5% to 6.7% chromium, up to 0.6% aluminum, up to 0.05% carbon with the balance iron, the proportions of nickel, titanium, carbon, and aluminum being so correlated that $$Ni-3.69(Ti-4C+Al-0.9)$$

is from 33.0 to 34.6%, where Ni, Ti, C and Al are respectively the weight percentages of nickel, titanium, carbon and aluminum present in the alloy, said alloy being characterized in the cold worked and fully age hardened condition by a combination of characteritics including an intensity of magnetization not greater than 46 c.g.s.u., a high proportional limit on the order of about 81 long tons per square inch and a thermoelastic coefficient in the range from minus $10\times10^{-6}$ per degree centigrade to $10\times10^{-6}$ per degree centigrade and said alloy being substantially insensitive to changes in thermoelastic coefficient resulting from variations in the amount of cold working prior to age hardening provided that said cold working is sufficient to effect a reduction in area within the range of 10% to 70%.

3. A vibratory element for transmitting mechanical vibrations and for use where low signal attenuating characteristics and a low temperature coefficient of time delay are required made of a cold worked and fully age hardened alloy consisting of from 41.4 to 43% nickel, from 2.5 to 3.1% titanium, from 6.3 to 7.1% chromium, up to 0.6% aluminum, up to 0.05% carbon with the balance iron and having the relationship between the weight percentages of nickel content (Ni), titanium content (Ti), carbon content (C), and aluminum content (Al) such that Ni—3.69(Ti—4Cl+Al—0.9) is from about 33.0 to 34.6%, said cold worked and fully age hardened alloy being characterized by low damping capacity including a magnetomechanical hysteresis loop of small area and a low intensity of magnetization not greater than about 46 c.g.s.u. and also characterized by a thermoelastic coefficient in the range from minus $20\times10^{-6}$ per degree centigrade to $20\times10^{-6}$ per degree centigrade.

4. A precision spring for indicating and controlling devices depending on elastic deflection and for use where low hysteresis, an improved high proportional limit and a low temperature coefficient of stiffness are required made of a cold worked and fully age hardened alloy consisting of from 41.4 to 43% nickel, from 2.5 to 3.1% titanium, from 6.3 to 7.1% chromium, up to 0.6% aluminum, up to 0.05% carbon with the balance iron and having the relationship between the weight percentages of nickel content (Ni), titanium content (Ti), carbon content (C), and aluminum content (Al) such that Ni—3.69(Ti—4C+Al—0.9) is from about 33.0 to 34.6%, said cold worked and fully age hardened alloy being characterized by a magnetomechanical hysteresis loop of small area, a high proportional limit on the order of about 81 long tons per square inch and a thermoelastic coefficient in the range of from minus $20\times10^{-6}$ per degree centigrade to $20\times10^{-6}$ per degree centigrade.

References Cited in the file of this patent

UNITED STATES PATENTS

| | | |
|---|---|---|
| 2,266,482 | Pilling et al. | Dec. 16, 1941 |
| 2,673,482 | Bostwick | Mar. 30, 1954 |
| 2,730,260 | McCullough | Jan. 10, 1956 |